United States Patent Office 3,464,156
Patented Sept. 2, 1969

3,464,156
AGRICULTURAL SOIL COMPOSITIONS AND METHOD FOR USING SAME TO TREAT AGRICULTURAL SOIL
Dilworth T. Rogers, Summit, and John C. Munday, Cranford, N.J., assignors to Esso Research and Engineering Company, a corporation of Delaware
No Drawing. Continuation-in-part of application Ser. No. 368,729, May 19, 1964. This application Dec. 19, 1967, Ser. No. 691,724
Int. Cl. A01c 7/00; C08h 13/00; C07d 33/30
U.S. Cl. 47—58                          11 Claims

ABSTRACT OF THE DISCLOSURE

This disclosure relates to an agricultural soil or soil conditioning composition comprising (1) a reaction product of a phosphorus compound, such as a sulfide, halide, or oxide of phosphorus, and a residual petroleum hydrocarbon and, additionally, may contain (2) asphalt and/or (3) agricultural soil, which reaction product, if desired, may be reacted with a basic material such as an alkaline hydroxide, oxide, or carbonate. Also disclosed is a method for treating an agricultural soil with a growth improving amount of the aforesaid composition.

Cross-reference to other applications

This application is a continuation-in-part of Dilworth T. Rogers et al. copending U.S. patent application Ser. No. 368,729, filed on May 19, 1964, now abandoned.

Description of the invention

The present invention is broadly concerned with the conditioning of soils, and is specifically concerned with improving the tilth of agricultural soils. In particular, it relates to the improvement of soils by treatment with improved asphalts and other residual petroleum hydrocarbons that contain phosphorus compounds.

Millions of acres of potentially valuable grazing lands in the western half of the United States along with areas even more vast in other countries normally do not receive sufficient rainfall to reseed and establish grass crops suitable to maintain livestock within economically feasible geographical limits. Imprudent management in marginal cropping areas and overgrazing of poorly established grasslands followed by wind erosion has only served to accentuate the problem. Attempts to seed or reseed these semi-arid lands with suitable range grasses have resulted in the expenditure of large sums in labor and material. Even so, the seeding techniques employed in the past have been only about 10 to 30% successful in the moisture limited areas.

The growth of plants in soil requires that nutrients, water, and air be available to the root system, and it is the soil structure that determines the availability of these essentials. Soil structure determines water uptake and retention, and the amount of air present in the soil. If inadequate water is present, the plant cannot utilize plant nutrients even in a fertile soil. If excessive water is present, insufficient air is present, and the plant cannot make efficient use of the nutrients. Both the germination of seeds and the growth of plant roots require respiration. If there is a limited supply of oxygen as a result of poor soil structure, germination is delayed and growth is retarded. This effect is compounded by the resultant small root system, which restricts the soil volume in which nutrients are available to the plant.

In addition to these direct effects on plant growth, poor soil structure hinders the development of microorganisms in the soil. Nitrification process that should result in the formation of nitrates are retarded, and the plants suffer from lack of available nitrogen. Furthermore, since the tilth of an agricultrual soil depends in large measure on soil bacteria, their scarcity is highly deleterious. Other results of poor soil structure are high rates of erosion, excessive compaction, and severe crusting. The disadvantages of poor soil structure are evident not only in soils of high clay content, but also in coarse sandy soils which exhibit high leaching rates and low water retention.

It is an object of the invention to improve the structure of soils that are urged for agriculture. It is a further object to increase the tilth of agricultural soils, particularly of heavy loams and soils of high clay content. Another object of the invention is to increase the penetration of rainfall and to decrease runoff and erosion. A further object is to increase the fertility of agricultural soils by providing nutrients and essential elements in a novel and easily assimilated form.

Accordingly, in order to achieve the foregoing objects there is provided, in one aspect of the invention, an agricultural soil composition comprising a major proportion of an agricultural soil and a minor proportion of an organic compound selected from the group consisting of residual petroleum hydrocarbons, olefin polymers, and lower alcohols, said compound having been treated with 1–20 wt. percent of an inorganic phosphorus compound selected from the group consisting of sulfides and oxides of phosphorus at a temperature in the range of 150°–450° F. for 1–10 hours.

In another aspect of this invention, consistent with the above objects, there is provided a method of treating agricultural soil, comprising adding to said soil a growth improving amount of a soil conditioning composition comprising an organic compound selected from the group consisting of residual petroleum hydrocarbons, olefin polymers, and lower alcohols, said compound having been treated with 1–20 wt. percent of an inorganic phosphorus compound selected from the group consisting of sulfides and oxides of phosphorus at a temperature in the range of 150°–450° F. for 1–10 hours.

It has been found that soils can be improved in structure by the addition thereto of asphalts or other residual oils that have been combined with phosphorus compounds. The phosphorus-containing asphalts or residuals can be secured preferably by reacting the asphalt or residual per se with a compound such as phosphorus pentasulfide, or by incorporating in the asphalt or residual a phosphorus-containing material such as $P_2S_5$-treated alcohol or hydrocarbon polymer like polyisobutylene, polyisoprene, polybutadiene, polyterpene, etc., of about 1,000 to 5,000 molecular weight. The phosphorus-containing chemicals which are used to treat the asphalt, residual oil, alcohol or hydrocarbon polymer include the following sulfides, oxides and halides, but are not limited thereto: $P_2S_5$, $P_4S_3$, $P_4S_7$, $P_2O_5$, $P_2O_3$, $POCl_3$, $PCl_5$, $PCl_3$, and the like. $P_2O_5$ and $P_2S_5$ are preferred, particularly the latter. The reaction conditions used in phosphorizing the asphalt, alcohol, polymer, etc., with these reagents are well known. For example, asphalt can be reacted with 1 to 20 wt. percent, preferably 2 to 10%, of $P_2S_5$ or $P_2O_5$ by heating for 1 to 10 hours at temperatures ranging from 150° F. to 450° F., preferably 250° F. to 350° F. Also, alcohols such as isopropanol, amyl alcohol, etc., can be phosphorised or phosphosulfurized by warming with ½ mole of $P_2O_5$ or $P_2S_5$ per mole of alcohol. Polyisobutylene of about 800 to 10,000 molecular weight, preferably 1,000 to 3,000, can be phosphosulfurized by reaction with 1 to 15% by weight of $P_2S_5$ at about 25° F. to 350° F., in the presence of a peroxide catalyst as disclosed in U.S. Patent No. 2,768,999, entitled "Phosphosulfurized Hydrocarbons and Production Thereof," if desired. When an alcohol or olefin polymer is phosphorized rather than asphalt itself, the product is added to the asphalt or residual generally in proportions of from 1 to 20 wt. percent.

The phosphorization and phosphosulfurization products are acidic. This fact is especially useful in a preferred modification of the invention, whereby the phosphorus-containing products, before admixing with the soil, are combined with one or more reagents that contain other elements essential to plant growth. Thus, the products are preferably reacted with reagents which enhance their growth-promoting activity, such as ammonia, amines, quaternary amines, and the oxides, hydroxides, carbonates, and chlorides of metals which are esential to plant growth such as potassium, copper, manganese, iron, calcium, magnesium, molybdenum, boron, and zinc. The relative amounts of reagents is a matter of choice. For example, for use with plants preferring alkaline conditions, the acidity of the phosphorus-containing products can be completely neutralized or overneutralized by an alkaline hydroxide, oxide or carbonate such as $K_2CO_3$, CaO, etc., while with plants preferring acidic conditions, the products can be incompletely neutralized. In either case, trace quantities of trace elements can be incorporated.

The phosphorus-containing products of the present invention perform a number of functions in soils. First of all they serve to agglomerate fine soil particles with the consequence that the soil is more permeable to air and water. They make the soil more friable and loose. They increase water penetration, reduce runoff, and decrease crusting and soil erosion. They also assist in the retention of water in the soil and accelerate the absorption of water and nutrients by the plant roots. A main function, however, is to stimulate plant growth both directly and indirectly. They stimulate plant growth directly by providing in easily available form the elements required for plant growth such as phosphorus, sulfur, nitrogen, potassium, and trace elements, while they promote plant growth indirectly by facilitating the growth of various soil bacteria which fix atmospheric nitrogen and which produce soil humus.

The products of the instant invention may be applied to the soil in a number of ways. For example, if the phosphorus-containing product is sufficiently fluid it can be applied as a fine spray using compressed air or steam. More viscous products have to be melted prior to spraying. After spraying the product is mixed into the soil with conventional equipment such as discs. Another method consists in spraying the product as a water emulsion followed by mixing. In some instances the phosphorus-containing product, such as that obtained by treating residual oils or asphalt with phosphorus oxide or sulfide will emulsify directly with water when fed to a colloid mill; that is, no auxiliary emulsifying agent is needed. In other cases it is advantageous to add either a cationic or anionic emulsifying agent. The formation of an internal emulsifying agent is facilitated if the phosphorus-containing product is treated with a base, for example a quaternary ammonium base, prior to feeding to the colloid mill. If the products of this invention have a high melting point, they can be fluidized by means of a solvent, or they can be pulverized and added to the soil as finely divided solid. Finally, the product after spraying on the surface of the ground may be allowed to remain there for a period of time where it will serve as a mulch to prevent the evaporation of water and to control the development of weeds. After serving in this capacity it can then be worked into the soil where it will serve as a soil conditioner.

The invention will be illustrated by the following examples:

Example 1

A straight reduced Venezuelan asphalt having a penetration of 89 mm./10 at 77° F. and a softening point of 113° F. is treated with 1 wt. percent of $P_2S_5$ by heating for two hours at 400° F. with agitation. No attempt is made to exclude air. The temperature is lowered to 250° F., 1 wt. percent of triethyl cetyl ammonium hydroxide is added, and stirring is continued for one hour. The product, which contains as an emulsifier the quaternary ammonium salt of $P_2S_5$-treated asphalt, is emulsified by mixing with an equal weight of water in a colloid mill. The result is a stable emulsion.

The emulsion is mixed with 4 volumes of water and the diluted emulsion containing 10% by weight of $P_2S_5$-treated asphalt is sprayed onto soil at the rate of about 450 pounds of active ingredient per acre.

Example 2

An oxidized asphalt having a penetration of 18 mm./10 at 77° F. and a softening point of 213° F. is heated for two hours at 400° F. with 5 wt. percent $P_2O_5$. The product is a black, friable solid which is pulverized to pass a 100-mesh screen. The resulting powder is mixed with soil at the rate of 2,000 pounds per acre.

Example 3

An asphalt flux is treated with 2.5 wt. percent $P_2S_5$ by heating for three hours at 375° F., and the acidic product is neutralized by stirring with potassium hydroxide. A 40% emulsion of the neutralized product is made by mixing it with water in a colloid mill. Before using, the emulsion is diluted to a concentration of 17.5%. It is then sprayed onto a silty clay loam and mixed into the soil by discing.

Example 4

Polyisobutylene having a molecular weight of about 1,100 is phosphosulfurized by heating with 15 wt. percent of $P_2S_5$ for four hours at 300° F. to 320° F. under an atmosphere of nitrogen. The product is then blown with steam for several hours, which reduces the sulfur content somewhat by converting —SH groups to —OH groups. The product is then blended with an oxidized asphalt such as that used in Example 2, forming a 10% blend which is emulsified in water and used as a soil conditioner.

Example 5

The oxidized asphalt of Example 2 is phosphosulfurized by heating with stirring for one hour at 275° F. with 5 wt. percent $P_2S_5$. The phosphosulfonization decreases the penetration from 18 to 6, increases the softening point from 213° F. to more than 315° F., and increases the insolubility in 86° naphtha from 39.6% to 49.1%. The product is dissolved in toluene, making a 2/1 asphalt/toluene cutback, and this is incorporated in New Jersey red clay soil in an amount equivalent to 6% of phosphosulfurized asphalt based on the soil. The mixture is compacted and dried overnight at 150° F., and is then placed in water. After one week the treated soil is permeated and covered with greyish microorganisms, whereas with untreated soil no such beneficial growth takes place.

Petroleum asphalts are generally prepared from petroleum residual oils obtained by the distillation of an asphaltic or semi-asphaltic crude oil or thermal tar or by the fluxing of harder residual asphalts with heavy petroleum distillates. Such residual oils are high boiling liquids or semi-solids which may have softening points from about 32° F. to about 120° F. and are generally characterized by specific gravities ranging from about 0.85 to about 1.07 at 77° F. Other properties of such residual oils, normally termed asphalt bases or asphalt fluxes, may vary to a considerable extent depending upon the particular crude oil from which they are derived.

Asphalts prepared from residual oils such as those set forth above may be classified as either straight reduced asphalts or as oxidized asphalts. Straight reduced asphalts are produced by the steam distillation, vacuum distillation, blending, or solvent deasphalting of residual oils. These operations remove a significant quantity of the lower boiling, more volatile material present in the residual oils and result in a product having a softening point between about 100° F. and about 170° F. Although higher softening points could be obtained by further treatment of the asphalt flux, straight run asphalts having softening points in excess of about 170° F. are characterized by extremely low penetration and ductility values and hence are too brittle to be of practical application generally. Straight reduced asphalts are generally used for paving and in related applications wherein weathering properties and those related to resistance to flow are not critical.

Oxidized asphalts are produced by contacting a residual oil with air or a similar oxidizing agent, alone or in the presence of an oxidizing catalyst such as ferric chloride, phosphorus pentoxide or the like. The oxidation process serves to dehydrogenate certain constituents of the asphalt, leading to the evolution of water and some carbon dioxide. Only constituents are thus converted into resins and resins are converted into asphaltenes. Very little oil is removed during the oxidation operation. The penetration and ductility properties of oxidized asphalts are generally somewhat higher for a given softening point than are those of the straight reduced products.

It is desirable that the asphalt composition be emulsified, preferably as asphalt and water emulsion, so as to permit its efficient application to the ground so as to secure the desired spreading characteristics. It is essential that the emulsion be stable and not break until it is on the ground since these emulsions must be transported over a wide territorial area and ultimately be placed on the ground in the desired areas by suitable spreading equipment.

In accordance with the present invention, the phosphorus-containing asphalts of the present invention may be used in conjunction with other agents such as preemergence weed killers, herbicides, fungicides and the like, as well as various plant nutrients.

Asphalt emulsions which are suitable for use with this invention may be either acidic (cationic) or basic (anionic) although the acidic emulsions are preferred. Both are asphalt-in-water emulsions. Typical specifications for both types are listed in the following table.

TABLE I.—CHARACTERISTICS AND COMPOITIONS OF ACIDIC AND BASIC EMULSIONS CONCENTRATES

| | Basic | Acidic |
|---|---|---|
| Emulsion characteristics: | | |
| Viscosity, Saybolt Furol at 77° F | 10-200 | 10-200 |
| Residue (by distillation) wt. percent | 57-70 | 57-70 |
| Settlement, 5 days, wt. percent | 0-20 | 0-20 |
| Residue characteristics: | | |
| Penetration at 77°F., 100 g., 5 sec | 10-200 | 10-200 |
| Solubility in CS$_2$, percent | 97+ | 97+ |
| Ductility at 77° F., cm | 40+ | 40+ |
| Softening Point, ° F | 100-175 | 100-175 |
| Composition, wt. percent: | | |
| Water | 30-43 | 30-43 |
| Asphalt | 57-70 | 57-70 |
| Emulsifier (preferably polyamines for acidic emulsions, fatty acids for basic) | 0.10-10.0 | 0.1-10.0 |
| NaOH | 0.1-1.0 | |
| HCl (36%) | | 0.1-1.0 |

Suitable emulsifying agents for use in preparing these emulsions include the following:

Cationic agents:
(1) Primary, secondary, tertiary, and polyamine salts such as the diamine dihydrochloride.

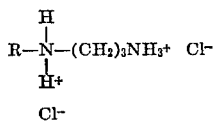

where R is an alkyl chain. In general, the alkyl chains of the amines may contain 8 to 22 carbon atoms with 16 to 18 being preferred.

(2) Amines such as those used in forming the salts of (1) condensed with 1 to 10 moles of ethylene oxide per mole of amine such as

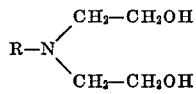

where R is as defined in (1).

(3) Quaternary ammonium salts such as $$[R_3-N]+Cl^-$$

(4) Dimethylated amine salts such as

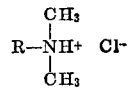

(5) Aromatic amine salts and cyclic amine salts.
(6) 2-imidazoline.

Anionic agents:
Alkali metal salts of fatty acids such as

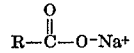

where R is an alkyl or olefinic chain with 8 to 22 carbon atoms, preferably 14 to 18. The potassium salt may also be used. Also, the emulsifying agent is not always one specific compound but can be a mixture of salts of fatty acids in which R varies in length. Examples of these are a sodium salt of pine wood lignin and a salt of a long chain acid resin from the destructive distillation of pine wood stumps; also, fine clays such as bentonite can be used.

Whereas, the actual emulsifying agents for the cationic and anionic emulsions are the amine salts or fatty acid salts, these salts are usually formed in the aqueous emulsifying solution by reaction of the amine with an acid such as HCl and the fatty acid with a base such as NaOH. As substitutes for the HCl and NaOH, acetic acid or nitric acid can be used instead of HCl on a mole per mole basis, and KOH can be used instead of NaOH although the latter is cheaper.

For the purposes of this invention, the emulsions set forth in Table I may, for want of a better term, be referred to as emulsion concentrates. For the purposes of this invention, such emulsions are further diluted with 0.1 to 3 parts of water prior to application. For minimizing evaporation losses with soils in general it has been found that optimum results are obtained when about 0.1 to 1.70, preferably about 1.3, volumes of water are employed per equivalent volume of emulsion concentrate. More specifically, maximum effectiveness in retarding evaporation from a silt loam type soil while using a minimum amount of emulsion is obtained by spraying onto the soil an emulsion as characterized in Table I diluted to an asphalt concentration of 10 to 40%, preferably 20 to 35%. These emulsions may be prepared in the conventional manner, as follows:

The emulsifying solution of the desired formulation at a temperature of 120° F. to 150° F. and the asphalt at a temperature of about 240° F. may be fed in separate streams to a conventional colloid mill. Other conventional techniques for effecting emulsification may be employed if colloid milling is not convenient. The preferred emulsification temperature is about 180° F. to 190° F. A thin continuous film of such emulsion will retard evaporation rates by 90 to 99% as compared to bare soil. Such emulsions should be applied at a rate in the range of 150 to 1,000, preferably 250 to 750 gallons of undiluted emulsion concentrate per acre of coverage. The asphalt emulsions may comprise from about 10 to 75% by weight of asphalt and 90 to 25% by weight of water.

In summary, the invention comprises a method of treating agricultural soils to improve their structure which consists in mixing with the soil a phosphorized (or phosphorsulfurized) petroleum residual, such as asphalt.

Preferably, the asphalt is phosphorized by direct reaction with a reagent such as $P_2S_5$ or $P_2O_5$, but phosphorization can also be secured by the addition of a phosphorized alcohol or olefin polymer. In a preferred modification, the phosphorized asphalt, before mixing with the soil, is combined with reagents which contain plant nutrients and essential trace elements.

What is claimed is:

1. A method of treating agricultural soil, comprising adding to said soil a growth improving amount of a soil conditioning composition comprising an organic compound selected from the group consisting of residual petroleum hydrocarbons, olefin polymers, and lower alcohols, said compound having been treated with 1-20 wt. percent of an inorganic phosphorus compound selected from the group consisting of sulfides and oxides of phosphorus at a temperature in the range of 150°-450° F. for 1-10 hours.

2. A method according to claim 1 wherein said organic compound is an asphalt.

3. A method according to claim 1 wherein said organic compound is an olefin polymer.

4. A method according to claim 1 wherein said soil conditioning composition additionally comprises an asphalt.

5. A method according to claim 1 wherein said soil conditioning composition is a finely divided solid.

6. A method according to claim 1 wherein said reaction product is treated with a basic material.

7. A method according to claim 1 wherein said inorganic phosphorus compound is $P_2S_5$.

8. A method according to claim 1 wherein said inorganic phosphorus compound is $P_2O_5$.

9. A method according to claim 1 wherein said soil conditioning composition additionally comprises an emulsifying agent.

10. An agricultural soil composition comprising a major proportion of an agricultural soil and a minor proportion of an organic compound selected from the group consisting of residual petroleum hydrocarbons, olefin polymers, and lower alcohols, said compound having been treated with 1-20 wt. percent of an inorganic phosphorus compound selected from the group consisting of sulfides and oxides of phosphorus at a temperature in the range of 150°-450° F. for 1-10 hours.

11. An agricultural soil composition according to claim 10 wherein said soil conditioning composition additionally comprises an asphalt.

References Cited

UNITED STATES PATENTS

| | | | |
|---|---|---|---|
| 2,333,959 | 11/1953 | Smith | 47—9 |
| 2,677,620 | 5/1954 | Lemmon et al. | 106—269 |
| 2,780,557 | 2/1957 | Hardman et al. | 252—311.5 X |
| 2,851,824 | 9/1958 | Campbell | 47—58 |
| 2,995,433 | 8/1961 | Goren et al. | 47—58 X |
| 3,164,925 | 1/1965 | Harshman et al. | 47—9 |
| 3,274,138 | 9/1966 | Salvesen | 47—9 X |
| 3,275,586 | 9/1966 | Wurstner et al. | 106—273 |

ROBERT E. BAGWILL, Primary Examiner

U.S. Cl. X.R.

47—9; 106—269, 277; 260—28.5